(12) United States Patent
Jung

(10) Patent No.: US 12,388,815 B2
(45) Date of Patent: Aug. 12, 2025

(54) APPARATUS FOR CONTROLLING ACCESS OF VEHICLE DIAGNOSTIC DEVICE AND METHOD THEREOF

(71) Applicants: Hyundai Motor Company, Seoul (KR); Kia Corporation, Seoul (KR)

(72) Inventor: Ho Jin Jung, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 482 days.

(21) Appl. No.: 17/811,842

(22) Filed: Jul. 11, 2022

(65) Prior Publication Data

US 2023/0188518 A1 Jun. 15, 2023

(30) Foreign Application Priority Data

Dec. 13, 2021 (KR) ........................ 10-2021-0178008

(51) Int. Cl.
*H04L 9/40* (2022.01)
*G07C 5/00* (2006.01)

(52) U.S. Cl.
CPC .......... *H04L 63/0853* (2013.01); *G07C 5/008* (2013.01)

(58) Field of Classification Search
None
See application file for complete search history.

(56) References Cited

U.S. PATENT DOCUMENTS

| | | | | |
|---|---|---|---|---|
| 2003/0009271 | A1* | 1/2003 | Akiyama | H04L 69/329 701/29.6 |
| 2007/0180532 | A1* | 8/2007 | Cha | H04N 21/8173 348/E7.071 |
| 2014/0273820 | A1* | 9/2014 | Narayan | H04W 76/14 455/41.1 |
| 2017/0008488 | A1* | 1/2017 | Matsumoto | B60R 25/31 |
| 2017/0365107 | A1* | 12/2017 | Jeong | G07C 5/008 |
| 2018/0176876 | A1* | 6/2018 | Alam | H04W 60/00 |
| 2019/0047513 | A1* | 2/2019 | Fuke | H04L 67/12 |

* cited by examiner

*Primary Examiner* — Paul R Fisher
(74) *Attorney, Agent, or Firm* — Fox Rothschild LLP

(57) ABSTRACT

Disclosed is an apparatus for controlling access of a vehicle diagnostic device and a method thereof, in which the apparatus includes a communicator that provides a communication interface with the vehicle diagnostic device, a connector that provides a connection interface with an electronic control unit (ECU) in a vehicle, and a controller that performs primary authentication of the vehicle diagnostic device when the vehicle diagnostic device requests a diagnosis from the ECU, transmits a first response ID and a first failure message to the vehicle diagnostic device when the primary authentication fails, and forwards the first response ID and a second failure message from the ECU to the vehicle diagnostic device when the primary authentication is successful.

14 Claims, 5 Drawing Sheets

Case #1

Case #2

Case #3

APPARATUS FOR CONTROLLING ACCESS OF VEHICLE DIAGNOSTIC DEVICE AND METHOD THEREOF

CROSS-REFERENCE TO RELATED APPLICATION

This application claims under 35 U.S.C. § 119(a) the benefit of Korean Patent Application No. 10-2021-0178008, filed in the Korean Intellectual Property Office on Dec. 13, 2021, the entire contents of which are incorporated herein by reference.

BACKGROUND

Technical Field

The present disclosure relates to technology for controlling access of a vehicle diagnostic device to a vehicle by performing authentication of the vehicle diagnostic device.

Description of the Related Art

There is a rapid increase in the type and number of electronic components used for a vehicle, thus increasing the type and number of electronic apparatuses (e.g., electronic control unit) mounted in the vehicle. Here, the electronic apparatus may be mounted in a power train control system, a body control system, a chassis control system, a vehicle network, a multimedia system or the like.

The power train control system may indicate an engine control system, an automatic transmission control system or the like. The body control system may indicate a body electrical-equipment control system, a convenience device control system, a lamp control system or the like. The chassis control system may indicate a steering actuator control system, a brake control system, a suspension control system or the like. The vehicle network may indicate a controller area network (CAN), a FlexRay-based network, a media oriented system transport (MOST)-based network or the like. The multimedia system may indicate a navigator system, a telematics system, an infotainment system or the like.

The electronic apparatuses mounted in such a system may be connected to each other through the vehicle network, and each electronic apparatus may be connected to a different vehicle network, based on a characteristic of the electronic apparatus. The CAN may have a transmission rate of up to 1 Mbps, may automatically retransmit a collided frame, and may perform error detection based on cyclic redundancy check (CRC). The FlexRay-based network may have a transmission rate of up to 10 Mbps, may simultaneously transmit data through two channels, may perform synchronous data transmission or the like. The MOST-based network may be a communication network for high-quality multimedia and may have a transmission rate of up to 150 Mbps.

Meanwhile, the telematics system, infotainment system, advanced safety system or the like of the vehicle may each require a high transmission rate, system scalability or the like. However, the CAN, the FlexRay-based network or the like fails to fully satisfy these requirements. The MOST-based network may have a higher transmission rate compared to the CAN and the FlexRay-based network. However, it may require a lot of cost to use the MOST-based network in all networks of the vehicle. An Ethernet-based network may be considered as the vehicle network because of these problems. The Ethernet-based network may support bidirectional communications by using a pair of wires, and may have a transmission rate of up to 10 Gbps.

Such a vehicle network may include a central gateway (CGW) and the plurality of ECUs, the CGW may perform primary authentication on an external vehicle diagnostic device when the vehicle diagnostic device requests a diagnosis from a specific ECU, the specific ECU may perform secondary authentication on the vehicle diagnostic device when the primary authentication is successful, and the specific ECU may provide a diagnosis result to the vehicle diagnosis device when the secondary authentication is successful. Here, the CGW may transmit a response ID (e.g., 0x700) and a response message (e.g., NRC AA) to the vehicle diagnostic device, and may forward no diagnostic request from the vehicle diagnostic device to the specific ECU, when the primary authentication fails. Here, the specific ECU may transmit the response ID (e.g., 0x700) and the response message (e.g., NRC AA) to the vehicle diagnostic device through the CGW when the primary authentication is successful and the secondary authentication fails. The vehicle diagnostic device may thus be unable to confirm whether the response ID (e.g., 0x700) and response message (e.g., NRC AA) transmitted from the vehicle may be transmitted from the CGW or the specific ECU.

As a result, the response ID and response message transmitted to the vehicle diagnostic device when the CGW fails the authentication and the response ID and response message transmitted to the vehicle diagnostic device when the ECU fails the authentication may be identical to each other. Conventional technology for controlling access of a vehicle diagnostic device is unable to confirm which component rejects the authentication of the vehicle diagnostic device.

The above information disclosed in this background section is provided only to assist in understanding of the present disclosure, and may thus include information not included in the existing technology already known to those skilled in the art to which the present disclosure pertains.

SUMMARY

The present disclosure has been made to solve the above-mentioned problems occurring in the existing technology while advantages achieved by the existing technology may be maintained intact.

An exemplary embodiment of the present disclosure may provide an apparatus for controlling access of a vehicle diagnostic device, and a method thereof, in which the vehicle diagnostic device may be allowed to confirm which component rejects the authentication of the vehicle diagnostic device by performing primary authentication of the external vehicle diagnostic device when the vehicle diagnostic device requests a diagnosis from an electronic control unit (ECU) positioned in the vehicle, by transmitting a first response ID and a first failure message to the vehicle diagnostic device when the primary authentication fails, and by forwarding the first response ID and a second failure message from the ECU to the vehicle diagnostic device when the primary authentication is successful.

The technical problems to be solved by the present disclosure are not limited to the aforementioned problems, and any other technical problems not mentioned herein will be clearly understood from the following description by those skilled in the art to which the present disclosure pertains.

According to an exemplary embodiment of the present disclosure, an apparatus for controlling access of a vehicle diagnostic device includes a communicator that provides a communication interface with the vehicle diagnostic device, a connector that provides a connection interface with an electronic control unit (ECU) in a vehicle, and a controller that performs primary authentication of the vehicle diagnostic device when the vehicle diagnostic device requests a diagnosis from the ECU, transmits a first response ID and a first failure message to the vehicle diagnostic device when the primary authentication fails, and forwards the first response ID and a second failure message from the ECU to the vehicle diagnostic device when the primary authentication is successful.

The controller may transmit no diagnostic request from the vehicle diagnostic device to the ECU when the primary authentication fails.

The controller may forward the first response ID and the second failure message from the ECU to the vehicle diagnostic device when the ECU fails in secondary authentication of the vehicle diagnostic device.

The controller may forward the first response ID and diagnostic data from the ECU to the vehicle diagnostic device when the ECU succeeds in secondary authentication of the vehicle diagnostic device.

The vehicle diagnostic device may confirm an authentication failure in the apparatus for controlling access of a vehicle diagnostic device, based on the first failure message.

The vehicle diagnostic device may confirm an authentication failure in the ECU, based on the second failure message.

The controller may perform the authentication of the vehicle diagnostic device when the vehicle diagnostic device requests the diagnosis from the controller, and the controller may transmit a second response ID and the second failure message to the vehicle diagnostic device when the authentication fails.

The vehicle diagnostic device may confirm an authentication failure in the apparatus for controlling access of a vehicle diagnostic device, based on the second failure message.

The communicator may provide a wired communication interface with the vehicle diagnostic device or a wireless communication interface with the vehicle diagnostic device.

The connector may provide a connection interface with a vehicle network to which the ECU may be connected.

According to an exemplary embodiment of the present disclosure, a method of controlling access of a vehicle diagnostic device includes requesting, by a vehicle diagnostic device, a diagnosis from an electronic control unit (ECU), performing, by a controller, primary authentication of the vehicle diagnostic device, transmitting, by the controller, a first response ID and a first failure message to the vehicle diagnostic device when the primary authentication fails, and forwarding, by the controller, the first response ID and a second failure message from the ECU to the vehicle diagnostic device when the primary authentication is successful.

The transmitting of the first response ID and the first failure message to the vehicle diagnostic device may include forwarding no diagnostic request from the vehicle diagnostic device to the ECU.

The forwarding of the first response ID and the second failure message from the ECU to the vehicle diagnostic device may include forwarding the first response ID and the second failure message from the ECU to the vehicle diagnostic device when the ECU fails in secondary authentication of the vehicle diagnostic device, and forwarding the first response ID and diagnostic data from the ECU to the vehicle diagnostic device when the ECU succeeds in the secondary authentication of the vehicle diagnostic device.

The transmitting of the first response ID and the first failure message to the vehicle diagnostic device may include confirming, by the vehicle diagnostic device, an authentication failure in the apparatus for controlling access of a vehicle diagnostic device, based on the first failure message.

The forwarding of the first response ID and the second failure message from the ECU to the vehicle diagnostic device may include confirming, by the vehicle diagnostic device, an authentication failure in the ECU, based on the second failure message.

The method may further include performing, by the controller, the authentication of the vehicle diagnostic device when the vehicle diagnostic device requests the diagnosis from the controller, and transmitting, by the controller, a second response ID and the second failure message to the vehicle diagnostic device when the authentication fails.

The transmitting of the second response ID and the second failure message to the vehicle diagnostic device may include confirming, by the vehicle diagnostic device, an authentication failure in the apparatus for controlling access of a vehicle diagnostic device, based on the second failure message.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
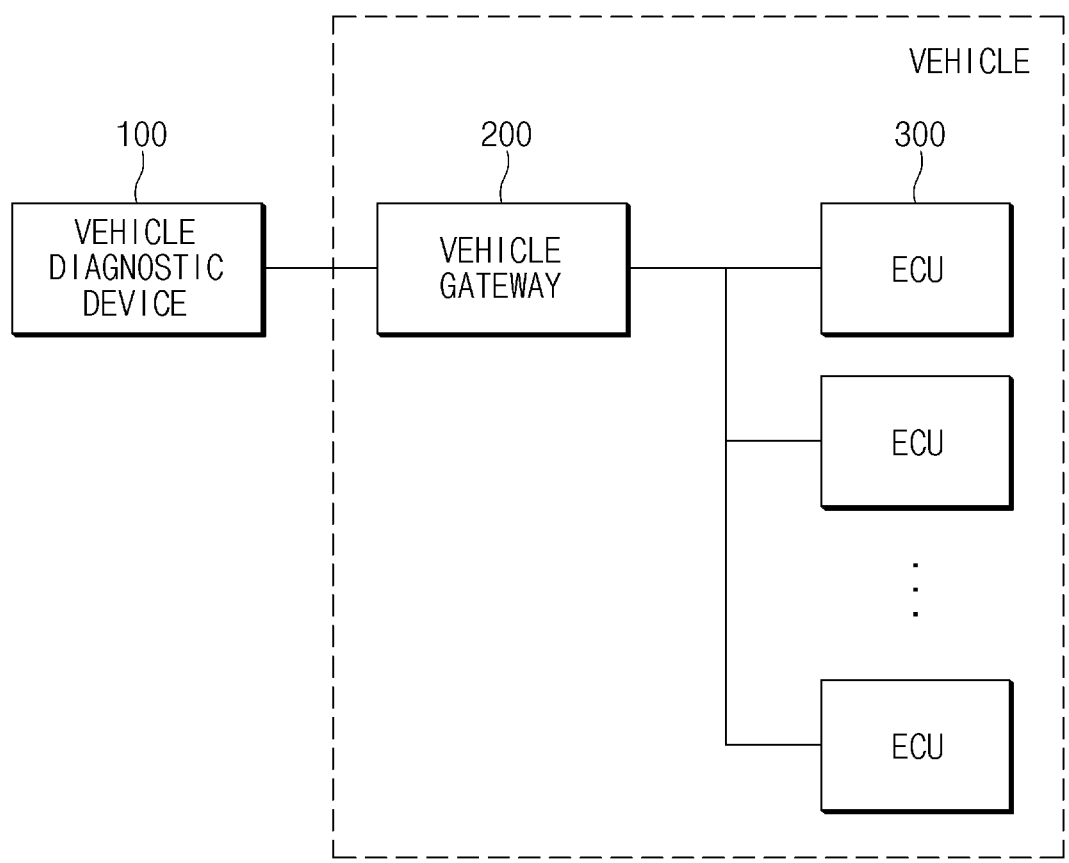
FIG. 1 is an exemplary view of a system for controlling access of a vehicle diagnostic device to which an embodiment of the present disclosure is applied.

It is understood that the term "vehicle" or "vehicular" or other similar tem as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "er", "or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In adding the reference numerals to the components of each drawing, it should be noted that the identical or equivalent component may be designated by the identical numeral even when they may be displayed on other drawings. Further, in describing the embodiment of the present disclosure, a detailed description of the related known configuration or function will be omitted when it is determined that it interferes with the understanding of the embodiment of the present disclosure.

In describing the components of the exemplary embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is an exemplary view of a system for controlling access of a vehicle diagnostic device to which an embodiment of the present disclosure is applied, and the description describes that an apparatus for controlling access of a vehicle diagnostic device according to an embodiment of the present disclosure may be exemplary implemented as a vehicle gateway 200.

As shown in FIG. 1, the system for controlling access of a vehicle diagnostic device to which an embodiment of the present disclosure is applied may include a vehicle diagnostic device 100, a vehicle gateway 200 and an electronic control unit (ECU) 300. The system may include one or more electronic control units.

A vehicle may be equipped with a vehicle control system, a driving assistance system and a driver comfort system, and each of which may be equipped with an ECU 300. Here, the ECUs 300 may be connected to each other through a vehicle network to transmit and receive data. Here, the ECU 300 may include not only a function of collecting information from a sensor and a camera, but also a function (information processing function) of generating new information by performing a calculation according to a preset program based on the collected information.

The plurality of ECUs 300 may be connected to each other by a sub-network structure via the vehicle gateway 200. The vehicle gateway 200 may include a computer or software that allows communication between networks using different communication networks and protocols within the vehicle network. The vehicle gateway 200 may be a network point that serves as an entrance to different networks, or may serve as a passage between different types of networks.

The vehicle may include at least one vehicle gateway 200, and here, the number of vehicle gateways 200 included in the vehicle may be determined corresponding to the number of ECUs 300 mounted in the vehicle and its connection type.

The external vehicle diagnostic device 100 that requests a fault diagnosis from the plurality of ECUs 300 mounted on the vehicle may be connected to the vehicle gateway 200 by wire or wirelessly. The vehicle diagnostic device 100 may request the diagnosis from the plurality of ECUs 300 connected through the vehicle networks of different communication methods. The vehicle diagnostic device 100 may be physically separated from the vehicle, and may be connected through terminals mounted in the vehicle.

A connection interface module requesting for a diagnostic process and transmitting a diagnosis result may be positioned between the vehicle diagnostic device 100 and the vehicle gateway 200. Here, the connection interface module may include an on-board diagnostics (OBD) terminal positioned in the vehicle. Here, the on-board diagnostics (OBD) may refer to a diagnostic standard for confirming and controlling an operation state of the vehicle. Even though initially used to improve a maintenance efficiency of an electronic component such as an engine, the OBD may also serve as an interface such as a trip computer that shows various vehicle information to a driver in addition to this purpose.

The vehicle may include an Ethernet terminal. The vehicle may not need the Ethernet terminal when the vehicle network includes only a controller area network (CAN). However, Ethernet communication may be additionally applied to the vehicle network in addition to the CAN as the number of the plurality of ECUs 300 mounted in the vehicle may be increased and an amount of the data transmitted and received by the plurality of ECU 300 may be increased. For example, 1 Mbps may be a maximum transmission bandwidth of CAN communication. At such a speed, there may be a limitation in configuring the vehicle network when the number of plurality of ECUs 300 in the vehicle is increased and data traffic is increased due to real-time video transmission (e.g., top view monitoring). Meanwhile, a data transmission rate of the CAN with flexible data-rate (CAN-FD) may be up to 2 Mbit/s in a multi-drop network and 5 Mbit/s in point-to-point communication, and a speed of the Ethernet may be up to 1 Gbps.

In addition, a telematics device mounted in a vehicle may be used as the connection interface module. A telematics device may be an example of a device which may provide comprehensive multimedia services for a vehicle using location information and a wireless communication network, may provide the driver with safe driving, emergency rescue, traffic guidance service or the like, and may provide a passenger with an infotainment services such as internet, movies, games, multimedia or the like In addition, the telematics device may be linked with the vehicle diagnostic device 100 to check the plurality of ECUs 300 mounted in the vehicle, may forward a diagnostic request message to the plurality of ECUs 300, and may transmit diagnostic data from the plurality of ECUs 300 to the vehicle diagnostic device 100.

The vehicle may include the plurality of ECUs 300, the vehicle network of different communication methods of connecting the plurality of ECUs 300 to each other, and at least one vehicle gateway 200 that connects the vehicle networks of different communication methods to each other. Here, the vehicle network may include the Ethernet communication, the controller area network (CAN) communication, the CAN with flexible data-rate (CAN-FD), local interconnect network (LIN) communication, media oriented systems transport (MOST) communication or the like The vehicle gateway 200 may allow the vehicle diagnostic device 100 to confirm which component rejects the authentication of the vehicle diagnostic device by performing primary authentication of the vehicle diagnostic device 100 when the external vehicle diagnostic device 100 requests a diagnosis from the ECU 300 positioned in the vehicle, by transmitting a first response ID and a first failure message to the vehicle diagnostic device 100 when the primary authentication fails, and by forwarding the first response ID and a second failure message from the ECU 300 to the vehicle diagnostic device 100 when the primary authentication is successful.

Hereinafter, the description specifically describes a configuration of the apparatus for controlling access of vehicle diagnostic device implemented as the vehicle gateway 200.

Figure 2:
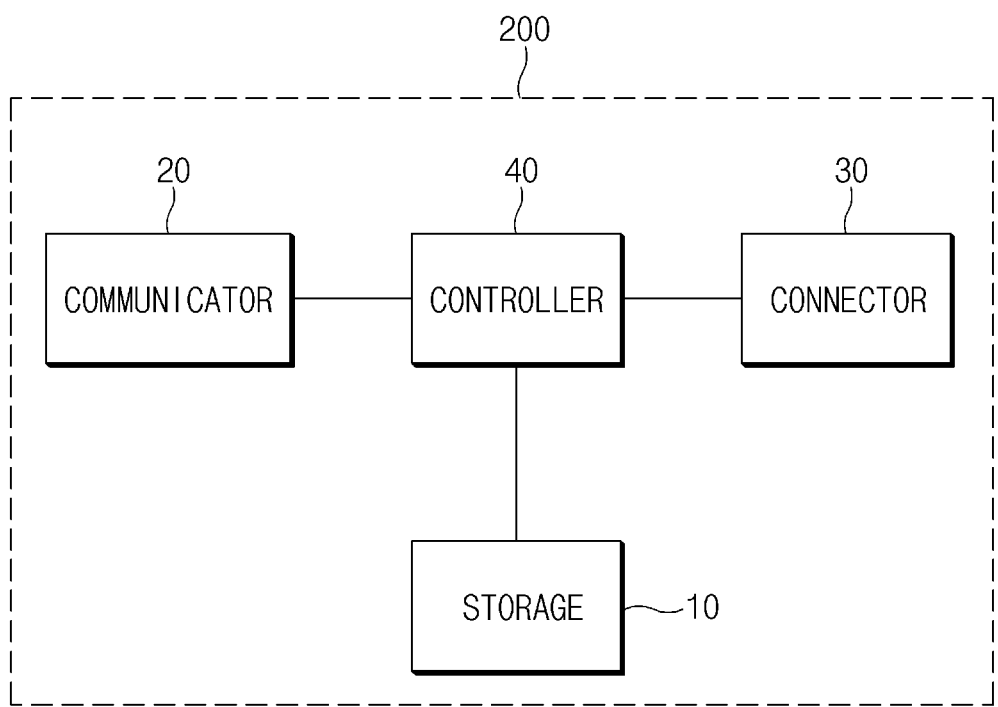
FIG. 2 is a block diagram of an apparatus for controlling access of a vehicle diagnostic device according to an embodiment of the present disclosure.

FIG. 2 is a block diagram of the apparatus for controlling access of a vehicle diagnostic device according to an embodiment of the present disclosure.

As shown in FIG. 2, the apparatus for controlling access of a vehicle diagnostic device according to an embodiment of the present disclosure may include a storage 10, a communicator 20, a connector 30 and a controller 40. Here, each component may be coupled with each other and implemented as one, or some components may be omitted based on a method of implementing the apparatus for controlling access of a vehicle diagnostic device according to an embodiment of the present disclosure.

Provided here is a description of each of the above components. First, the storage 10 may store various logics, algorithms and programs required in processes of performing the primary authentication of the vehicle diagnostic device 100 when the external vehicle diagnostic device 100 requests the diagnosis from the ECU 300 positioned in the vehicle, transmitting the first response ID and the first failure message to the vehicle diagnostic device 100 when the primary authentication fails, and forwarding the first response ID and the second failure message from the ECU 300 to the vehicle diagnostic device 100 when the primary authentication is successful.

The storage 10 may store the first response ID (e.g., 0x701) and a second response ID (e.g., 0x700), and may also store the first failure message (e.g., NRC CC) and the second failure message (e.g., NRC AA).

The storage 10 may include at least one type of a storage medium among types of memories such as a flash memory, a hard disk memory, a micro memory and a card memory (e.g., secure digital (SD) card or extreme digital (XD) card), or types of memories such as a random access memory (RAM), a static RAM (SRAM), a read-only memory (ROM), a programmable ROM (PROM), an electrically erasable PROM (EEPROM), a magnetic memory (or a magnetic RAM (MRAM)), a magnetic disk and an optical disk memory.

The communicator 20 may include a wired communication interface module and a wireless communication interface module. The wireless communication interface module may include at least one of a mobile communication module, a wireless internet module or a short-range communication module.

The mobile communication module may communicate with the vehicle diagnostic device 100 through mobile communication network constructed based on a technical standard or a communication method for mobile communication (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE) or long term evolution-advanced (LTE-A).

The wireless internet module may be a module for wireless internet access, and may communicate with the vehicle diagnostic device 100 through wireless local area network (i.e., wireless LAN (WLAN)), wireless-fidelity (Wi-Fi), wireless fidelity (Wi-Fi) direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A) or the like The short-range communication module may support communication with the vehicle diagnostic device 100 by using at least one technology of BLUETOOTH™, radio frequency identification (RFID), infrared data association (IrDA), ultra wideband (UWB), zigbee, near field communication (NFC), wireless universal serial bus (USB).

The connector 30 may be a module that provides a connection interface to the vehicle network, and may transmit the diagnostic request message to the ECU 300 connected to the vehicle network or receive the diagnosis result (diagnostic data) from the ECU 300.

The controller 40 may perform an overall control of each of the above components so that each component normally performs its function. The controller 40 may be implemented in hardware, or may be implemented in software, or may be implemented in a combination of hardware and software. The controller 40 may be implemented as a microprocessor, but may not be limited thereto.

In particular, the controller 40 may perform various controls in the processes of performing the primary authentication of the vehicle diagnostic device 100 when the external vehicle diagnostic device 100 requests the diagnosis from the ECU 300 positioned in the vehicle, transmitting the first response ID and the first failure message to the vehicle diagnostic device 100 when the primary authentication fails, and forwarding the first response ID and the second failure message from the ECU 300 to the vehicle diagnostic device 100 when the primary authentication is successful.

Hereinafter, the description specifically describes an operation of the controller 40 with reference to FIG. 3.

Figure 3:
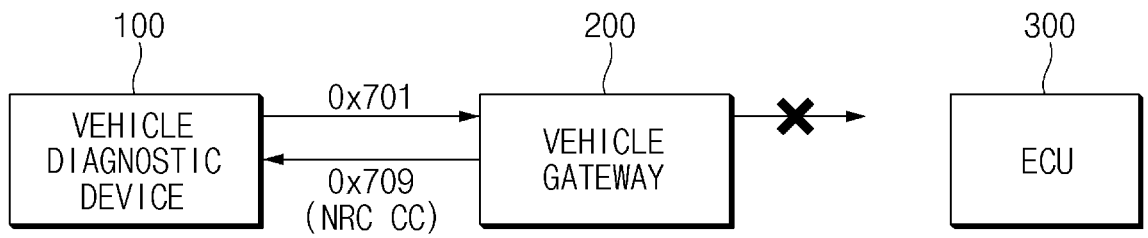
FIG. 3 is an exemplary view showing an operation of a controller positioned in the apparatus for controlling access of a vehicle diagnostic device according to an embodiment of the present disclosure.
Figure 3:
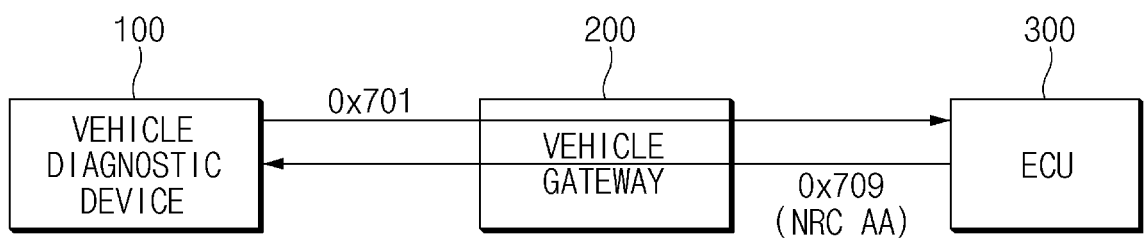
Figure 3:
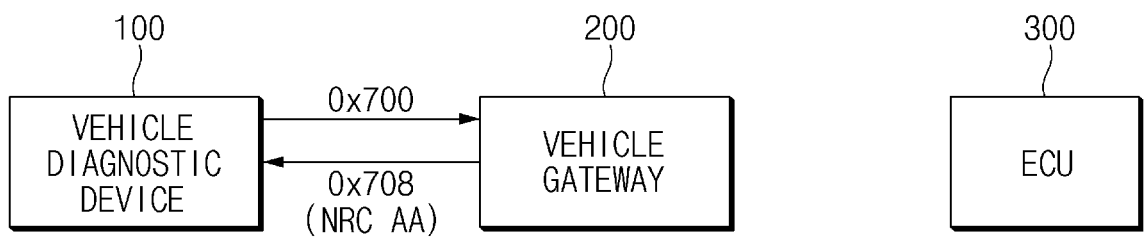

FIG. 3 is an exemplary view showing an operation of a controller positioned in the apparatus for controlling access of a vehicle diagnostic device according to an embodiment of the present disclosure, and the description describes Case #1, Case #2 and Case #3 as examples.

As shown in FIG. 3, Case #1 indicates a case where the controller 40 of the vehicle gateway 200 fails to authenticate the vehicle diagnostic device 100 when the vehicle diagnostic device 100 requests the diagnosis from the ECU 300. Here, the controller 40 of the vehicle gateway 200 may transmit the first response ID and the first failure message to the vehicle diagnostic device 100 rather than forwarding the diagnostic request from the vehicle diagnostic device 100 to the ECU 300. The vehicle diagnostic device 100 may then confirm that the vehicle gateway 200 may be the component that rejects the authentication of the vehicle diagnostic device, based on the first failure message.

That is, the vehicle diagnostic device 100 may transmit, to the vehicle gateway 200, '0x701' which may be an ID (i.e., Request ID) requesting the diagnosis from the ECU 300 among a plurality of IDs requesting for the diagnosis. Here, the controller 40 of the vehicle gateway 200 may perform the authentication of the vehicle diagnostic device 100 before forwarding '0x701' to the ECU 300. The controller 40 of the vehicle gateway 200 may then forward '0x701' to the ECU 300 when the authentication result is successful. However, the controller 40 may transmit, to the vehicle diagnostic device 100, '0x709' which may be a response ID corresponding to '0x701', and 'NRC CC' which may be a message indicating that the authentication fails, rather than forwarding '0x701' to the ECU 300 when the authentication result is a failure. Here, the vehicle diagnostic device 100 may be unable to receive any ID other than '0x709' as a response to '0x701' (by masking-processed as '0x709'). The vehicle diagnostic device 100 may thus receive 'NRC CC' transmitted along with '0x709' from the vehicle gateway 200, and confirm that the vehicle gateway 200 may be the component that rejects the authentication, based on 'NRC CC'.

Case #2 indicates a case where the controller 40 of the vehicle gateway 200 succeeding in authenticating the vehicle diagnostic device 100 when the vehicle diagnostic device 100 requests the diagnosis from the ECU 300. Here, the controller 40 of the vehicle gateway 200 may forward the diagnostic request from the vehicle diagnostic device 100 to the ECU 300, and forward the first response ID and the second failure message from the ECU 300 to the vehicle diagnostic device 100. The vehicle diagnostic device 100 may then confirm that the ECU 300 may be the component that rejects the authentication, based on the second failure message.

That is, the vehicle diagnostic device 100 may transmit, to the vehicle gateway 200, '0x701' which may be the ID (i.e., Request ID) requesting the diagnosis from the ECU 300 among the plurality of IDs requesting for the diagnosis. The controller 40 of the vehicle gateway 200 may then perform the authentication of the vehicle diagnostic device 100, and forward '0x701' to the ECU 300 when the authentication is successful. Here, the controller 40 may perform the same operation as Case #1 when the authentication fails. The ECU 300 may then perform the authentication of the vehicle diagnostic device 100, and the ECU 300 may transmit '0x709' which may be the response ID corresponding to '0x701', and 'NRC AA' which may be a message indicating that the authentication fails, to the vehicle diagnostic device 100 through the vehicle gateway 200 when the authentication result is the failure. Here, the vehicle gateway 200 may perform a routing function. Here, the vehicle diagnostic device 100 may be unable to receive any ID other than '0x709' as a response to '0x701' (by masking-processed as '0x709'). The vehicle diagnostic device 100 may thus receive 'NRC AA' transmitted along with '0x709' from the vehicle gateway 200, and confirm that the ECU 300 may be the component that rejects the authentication, based on 'NRC AA'.

In addition, the ECU 300 may perform the diagnosis when succeeding in authenticating the vehicle diagnostic device 100 and forward the diagnosis result to the vehicle diagnostic device 100 through the vehicle gateway 200. Here, the vehicle gateway 200 may perform the routing function.

Case #3 indicates a case where the controller 40 of the vehicle gateway 200 fails to authenticate the vehicle diagnostic device 100 when the vehicle diagnostic device 100 requests the diagnosis from the vehicle gateway 200. Here, the controller 40 of the vehicle gateway 200 may forward the second response ID and the second failure message to the vehicle diagnostic device 100. Here, the vehicle diagnostic device 100 requests the diagnosis from the vehicle gateway 200, and may thus confirm that the vehicle gateway 200 may be the component that rejects the authentication.

That is, the vehicle diagnostic device 100 may transmit, to the vehicle gateway 200, '0x700' which may be the ID (i.e., Request ID) requesting the diagnosis from the vehicle gateway 200 among the plurality of IDs requesting for the diagnosis. Here, the controller 40 of the vehicle gateway 200 may transmit, to the vehicle diagnostic device 100, '0x708' which may be a response ID corresponding to '0x700', and 'NRC AA' which may be the message indicating that the authentication fails when the controller 40 fails to authenticate the vehicle diagnostic device 100. Here, the vehicle diagnostic device 100 may be unable to receive any ID other than '0x708' as a response to '0x700' (by masking-processed as '0x708'). The vehicle diagnostic device 100 may thus receive 'NRC AA' transmitted along with '0x708' from the vehicle gateway 200, and confirm that the vehicle gateway 200 is the component that rejects the authentication, based on '0x708'.

In addition, the vehicle gateway 200 may perform the diagnosis when succeeding in authenticating the vehicle diagnostic device 100 and forward the diagnosis result to the vehicle diagnostic device 100.

Figure 4:
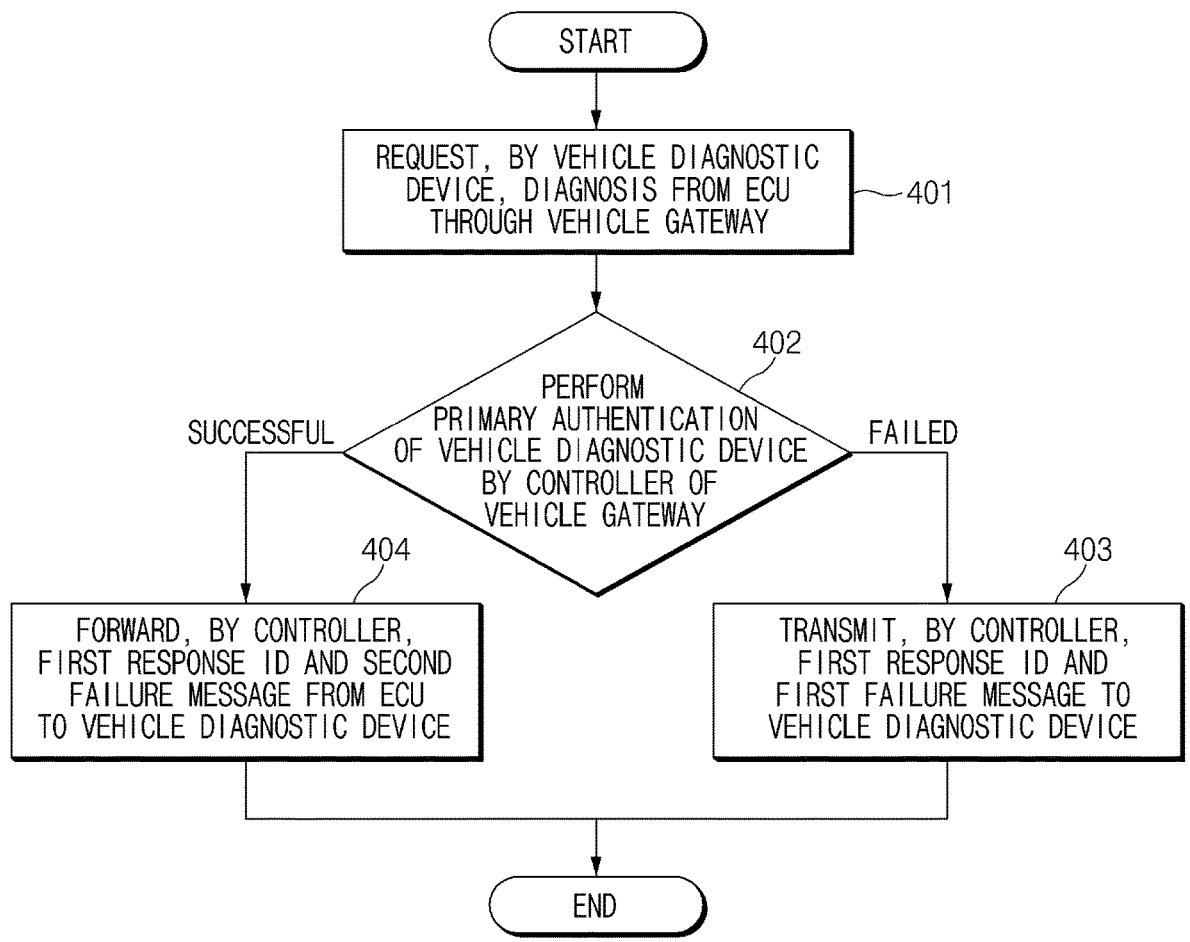
FIG. 4 is a flowchart of a method of controlling access of a vehicle diagnostic device according to another embodiment of the present disclosure.

FIG. 4 is a flowchart of a method of controlling access of a vehicle diagnostic device according to another embodiment of the present disclosure.

First, a vehicle diagnostic device 100 may request a diagnosis from an electronic control unit (ECU) 300 through a vehicle gateway 200 (401).

A controller 40 of the vehicle gateway 200 may then perform primary authentication of the vehicle diagnostic device 100 (402).

The controller 40 may transmit a first response ID and a first failure message to the vehicle diagnostic device 100 when the primary authentication fails (403).

The controller 40 may forward the first response ID and a second failure message from the ECU 300 to the vehicle diagnostic device when the primary authentication is successful (404). Here, the controller 40 may forward (or route) the first response ID and the second failure message from the ECU 300 to the vehicle diagnostic device 100 when the ECU 300 fails in secondary authentication of the vehicle diagnostic device 100, and forward (or route) the first response ID and diagnostic data from the ECU 300 to the vehicle diagnostic device 100 when the ECU 300 succeeds in the secondary authentication of the vehicle diagnostic device 100.

Figure 5:
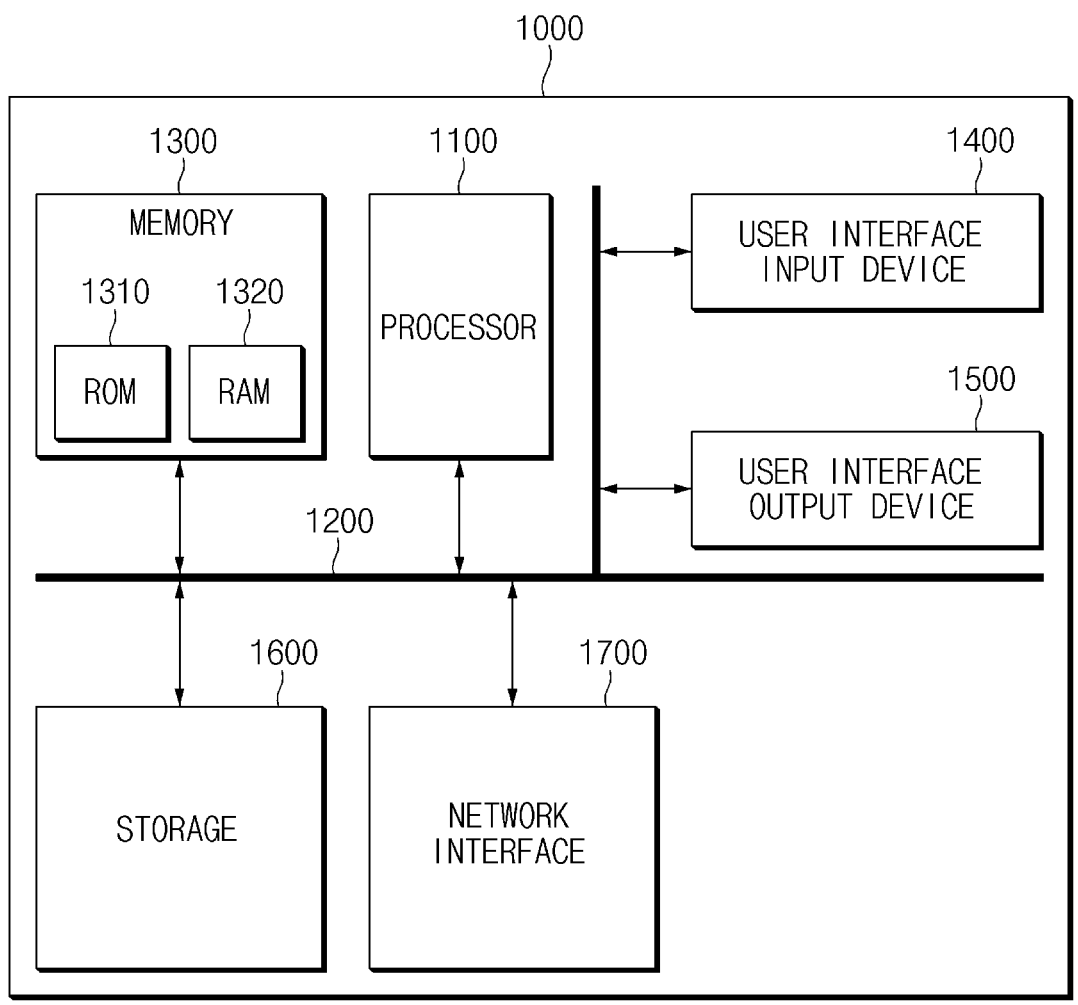
FIG. 5 is a block diagram showing a computing system executing the method of controlling access of a vehicle diagnostic device according to another embodiment of the present disclosure.

FIG. 5 is a block diagram showing a computing system executing the method of controlling access of a vehicle diagnostic device according to another embodiment of the present disclosure.

Referring to FIG. 5, a computing system may also implement the method of controlling access of a vehicle diagnostic device according to another embodiment of the present disclosure described above. A computing system 1000 may include at least one processor 1100, a memory 1300, a user interface input device 1400, a user interface output device 1500, a storage 1600 and a network interface 1700, which may be connected to each other by a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an erasable programming ROM (EPROM), an electrically erasable programming ROM (EEPROM), a register, a hard disk, a removable disk, a compact disk-ROM (CD-ROM). The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside in a user terminal. In another case, the processor and the storage medium may reside in the user terminal as separate components.

As set forth above, the apparatus for controlling access of a vehicle diagnostic device and the method thereof according to the embodiments of the present disclosure may allow the vehicle diagnostic device to confirm which component rejects the authentication of the vehicle diagnostic device by performing the primary authentication of the external vehicle diagnostic device when the vehicle diagnostic device requests the diagnosis from the ECU positioned in the vehicle, by transmitting the first response ID and the first failure message to the vehicle diagnostic device when the primary authentication fails, and by forwarding the first response ID and the second failure message from the ECU to the vehicle diagnostic device when the primary authentication is successful.

Hereinabove, although the present disclosure has been described with reference to the embodiments and the accompanying drawings, the present disclosure is not limited thereto, and may be variously modified and altered by those skilled in the art to which the present disclosure pertains without departing from the spirit and scope of the present disclosure claimed in the following claims.

What is claimed is:

1. An apparatus for controlling access of a vehicle diagnostic device, the apparatus comprising:
a communicator including a transceiver and configured to provide a communication interface with the vehicle diagnostic device;
a connector including a transceiver and configured to provide a connection interface with an electronic control unit (ECU) in a vehicle; and
a controller including a processor and configured to:
perform primary authentication of the vehicle diagnostic device when the vehicle diagnostic device requests a diagnosis from the ECU,
transmit a first response ID and a first failure message to the vehicle diagnostic device when the primary authentication fails,
forward the first response ID and a second failure message from the ECU to the vehicle diagnostic device when the primary authentication is successful,
forward no diagnostic request from the vehicle diagnostic device to the ECU when the primary authentication fails; and
forward the first response ID and the second failure message from the ECU to the vehicle diagnostic device when the ECU fails in secondary authentication of the vehicle diagnostic device.

2. The apparatus of claim 1, wherein the controller is configured to forward the first response ID and diagnostic data from the ECU to the vehicle diagnostic device when the ECU succeeds in secondary authentication of the vehicle diagnostic device.

3. The apparatus of claim 1, wherein the vehicle diagnostic device is configured to confirm an authentication failure in the apparatus for controlling access of the vehicle diagnostic device, based on the first failure message.

4. The apparatus of claim 1, wherein the vehicle diagnostic device is configured to confirm an authentication failure in the ECU, based on the second failure message.

5. The apparatus of claim 1, wherein the controller is configured to perform an authentication of the vehicle diagnostic device when the vehicle diagnostic device requests the diagnosis from the controller, and the controller is configured to transmit a second response ID and the second failure message to the vehicle diagnostic device when the authentication fails.

6. The apparatus of claim 5, wherein the vehicle diagnostic device is configured to confirm an authentication failure in the apparatus for controlling access of the vehicle diagnostic device, based on the second failure message.

7. The apparatus of claim 1, wherein the communicator is configured to provide a wired communication interface with the vehicle diagnostic device or a wireless communication interface with the vehicle diagnostic device.

8. The apparatus of claim 1, wherein the connector is configured to provide the connection interface with a vehicle network to which the ECU is connected.

9. A method of controlling access of a vehicle diagnostic device, the method comprising:
- requesting, by the vehicle diagnostic device, a diagnosis from an electronic control unit (ECU);
- performing, by a controller, primary authentication of the vehicle diagnostic device;
- transmitting, by the controller, a first response ID and a first failure message to the vehicle diagnostic device when the primary authentication fails; and
- forwarding, by the controller, the first response ID and a second failure message from the ECU to the vehicle diagnostic device when the primary authentication is successful,
- wherein the transmitting of the first response ID and the first failure message to the vehicle diagnostic device includes forwarding no diagnostic request from the vehicle diagnostic device to the ECU; and
- wherein forwarding of the first response ID and the second failure message from the ECU to the vehicle diagnostic device includes forwarding the first response ID and the second failure message from the ECU to the vehicle diagnostic device when the ECU fails in secondary authentication of the vehicle diagnostic device.

10. The method of claim 9, wherein the forwarding of the first response ID and the second failure message from the ECU to the vehicle diagnostic device further includes:
- forwarding the first response ID and diagnostic data from the ECU to the vehicle diagnostic device when the ECU succeeds in the secondary authentication of the vehicle diagnostic device.

11. The method of claim 9, wherein the transmitting of the first response ID and the first failure message to the vehicle diagnostic device includes:
- confirming, by the vehicle diagnostic device, an authentication failure in the apparatus for controlling access of the vehicle diagnostic device, based on the first failure message.

12. The method of claim 9, wherein the forwarding of the first response ID and the second failure message from the ECU to the vehicle diagnostic device includes
- confirming, by the vehicle diagnostic device, an authentication failure in the ECU, based on the second failure message.

13. The method of claim 9, further comprising:
- performing, by the controller, an authentication of the vehicle diagnostic device when the vehicle diagnostic device requests the diagnosis from the controller; and
- transmitting, by the controller, a second response ID and the second failure message to the vehicle diagnostic device when the authentication fails.

14. The method of claim 13, wherein the transmitting of the second response ID and the second failure message to the vehicle diagnostic device includes
- confirming, by the vehicle diagnostic device, an authentication failure in an apparatus for controlling access of a vehicle diagnostic device, based on the second failure message.

* * * * *